United States Patent
Miyashita

(10) Patent No.: US 8,141,344 B2
(45) Date of Patent: Mar. 27, 2012

(54) CONTROL APPARATUS AND CONTROL METHOD OF AN INTERNAL COMBUSTION ENGINE

(75) Inventor: Shigeki Miyashita, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 884 days.

(21) Appl. No.: 12/280,372

(22) PCT Filed: Jul. 25, 2007

(86) PCT No.: PCT/IB2007/002106
§ 371 (c)(1),
(2), (4) Date: Aug. 22, 2008

(87) PCT Pub. No.: WO2008/012646
PCT Pub. Date: Jan. 31, 2008

(65) Prior Publication Data
US 2009/0031706 A1 Feb. 5, 2009

(30) Foreign Application Priority Data
Jul. 25, 2006 (JP) .................... 2006-201563

(51) Int. Cl.
*F01N 3/20* (2006.01)

(52) U.S. Cl. ........................................ 60/285

(58) Field of Classification Search ............. 60/284, 60/285, 286, 288
See application file for complete search history.

(56) References Cited

U.S. PATENT DOCUMENTS

| | | | |
|---|---|---|---|
| 5,724,809 A | 3/1998 | Mitsutani et al. | |
| 6,014,859 A | 1/2000 | Yoshizaki et al. | |
| 6,336,320 B1 | 1/2002 | Tanaka et al. | |
| 2004/0187479 A1 | 9/2004 | Surnilla et al. | |
| 2005/0193720 A1* | 9/2005 | Surnilla et al. | 60/285 |

FOREIGN PATENT DOCUMENTS

| | | |
|---|---|---|
| EP | 0 748 927 | 12/1996 |
| EP | 0 899 431 | 3/1999 |
| EP | 0 971 104 | 1/2000 |
| GB | 2418377 A * | 3/2006 |
| JP | 1 27246 | 5/1989 |
| JP | 8 121153 | 5/1996 |
| JP | 8 189388 | 7/1996 |
| JP | 10 220267 | 8/1998 |

(Continued)

*Primary Examiner* — Thomas Denion
*Assistant Examiner* — Jonathan Matthias
(74) *Attorney, Agent, or Firm* — Oblon, Spivak, McClelland, Maier & Neustadt, L.L.P.

(57) ABSTRACT

An individual exhaust passage is provided independently for each cylinder group in an internal combustion engine having a plurality of cylinder groups each having a plurality of cylinders. A first catalyst is provided in each of the individual exhaust passages. Downstream of those first catalysts, the individual exhaust passages merge to form a common exhaust passage in which a second catalyst is provided. When control of the internal combustion engine is switched from cylinder group-specific control to stoichiometric control, an air-fuel ratio control portion makes the air-fuel ratio of a cylinder group in which the air-fuel ratio was made rich by cylinder group-specific control lean for a predetermined period of time, and makes the air-fuel ratio of a cylinder group in which the air-fuel ratio was made lean by the cylinder group-specific control rich for a predetermined period of time.

17 Claims, 8 Drawing Sheets

FOREIGN PATENT DOCUMENTS

| | | |
|---|---|---|
| JP | 2000-120477 | 4/2000 |
| JP | 2000-314310 | 11/2000 |
| JP | 2004-218541 | 8/2004 |
| JP | 2006-46291 | 2/2006 |
| JP | 2006-77659 | 3/2006 |
| JP | 2006-118433 | 5/2006 |

* cited by examiner

CONTROL APPARATUS AND CONTROL METHOD OF AN INTERNAL COMBUSTION ENGINE

BACKGROUND OF THE INVENTION

1. Field of the Invention

The invention relates to control that enables an exhaust gas control catalyst to effectively demonstrate the ability to purify exhaust gas in an internal combustion engine having a plurality of cylinder groups.

2. Description of the Related Art

One known exhaust gas control apparatus has an individual catalyst arranged in the exhaust passage of each cylinder group and another catalyst arranged downstream of the location where the exhaust passages merge together in an internal combustion engine having a plurality of cylinders sets, such as a so-called V-type internal combustion engine. Both Japanese Patent Application Publication No. 8-121153 (JP-A-8-121153) and Japanese Patent Publication No. 1-27246 (JP-B2-1-27246) describe examples of this kind of exhaust gas control apparatus.

In this kind of exhaust gas control apparatus, the oxygen storage capacity (hereinafter simply also referred to as "OSC") of each catalyst changes depending on the operating state of the internal combustion engine. Accordingly, unless the OSC of each catalyst is appropriately controlled, the ability of each catalyst to purify exhaust gas is not able to be utilized effectively.

SUMMARY OF THE INVENTION

This invention thus aims to enable an exhaust gas control catalyst to effectively demonstrate the ability to purify exhaust gas by appropriately controlling the OSC in each cylinder according to the operating state of an internal combustion engine.

A first aspect of the invention relates to a control apparatus of an internal combustion engine provided with a plurality of cylinder groups, which includes an individual exhaust passage connected to each cylinder group, a common exhaust passage connecting the individual exhaust passages, a first catalyst provided in each of the individual exhaust passages, a second catalyst provided in the common exhaust passage, and an exhaust control portion that controls a state of exhaust gas flowing into the first catalysts and the second catalyst. When control of an operating state of the internal combustion engine is switched, the exhaust control portion controls the state of the exhaust gas such that an oxygen storage capacity of at least one catalyst of the first catalysts and the second catalyst becomes a predetermined oxygen storage capacity.

The internal combustion engine of this first aspect includes a plurality of cylinder groups (banks) each having a plurality of cylinders, such as a V-type internal combustion engine. In this internal combustion engine, an individual exhaust passage is provided independently for each cylinder group and a first catalyst is provided in each of the individual exhaust passages. Downstream of those first catalysts, the individual exhaust passages merge to form a common exhaust passage in which a second catalyst is provided. Also, an air-fuel ratio control portion formed by an ECU and the like, for example, can control the air-fuel ratio in each cylinder group independently by adjusting the throttle opening amount and the fuel injection quantity and the like.

In the first aspect, the exhaust control portion may be an air-fuel ratio control portion that controls an air-fuel ratio of each of the cylinder groups independently, and when the air-fuel ratio control portion switches from cylinder group-specific control that makes the air-fuel ratio of one cylinder group rich and makes the air-fuel ratio of another cylinder group lean to stoichiometric control that makes the air-fuel ratios of all of the cylinder groups a stoichiometric air-fuel ratio, the air-fuel ratio control portion may make the switch to the stoichiometric control after making the air-fuel ratio of the cylinder group that was made rich by the cylinder group-specific control lean for a predetermined period of time and making the air-fuel ratio of the cylinder group that was made lean by the cylinder group-specific control rich for the predetermined period of time.

With the cylinder group-specific control, the air-fuel ratio control portion makes the air-fuel ratio of one cylinder group rich and makes the air-fuel ratio of another cylinder group lean. As a result, rich exhaust gas and lean exhaust gas merge at the downstream second catalyst, thereby increasing the temperature of the second catalyst. On the other hand, with stoichiometric control, the air-fuel ratio control portion controls the air-fuel ratios of all of the cylinder groups so that they become the stoichiometric air-fuel ratio.

According to the foregoing aspect, the oxygen storage capacity (OSC) of the first catalyst corresponding to the each cylinder group shifts to a neutral state (such as a state in which the OSC is 50%) in which the catalyst is able to maximally demonstrate the ability to purify exhaust gas for a predetermined period of time. Then the air-fuel ratio control portion switches to the stoichiometric control. As a result, the first catalysts can effectively utilize their ability to purify exhaust gas in stoichiometric control thereafter.

In the foregoing aspect, the predetermined period of time, wherein the predetermined period of time, and the air-fuel ratio of the each cylinder group during the predetermined period of time may be set such that the oxygen storage capacity of each of the first catalysts becomes approximately 50%.

In the foregoing first aspect, the exhaust control portion may be an air-fuel ratio control portion that controls an air-fuel ratio of each of the cylinder groups independently, and when the air-fuel ratio control portion switches from fuel cut control that stops fuel from being supplied to all of the cylinder groups to cylinder group-specific control that makes the air-fuel ratio of one cylinder group rich and makes the air-fuel ratio of another cylinder group lean, the air-fuel ratio control portion may set the air-fuel ratio of the one cylinder group and the air-fuel ratio of the other cylinder group such that the air-fuel ratio of the common exhaust passage becomes rich for a predetermined period of time.

In the foregoing aspect, when the air-fuel ratio control portion switches from the fuel cut control to the cylinder group-specific control, the air-fuel ratio control portion may set the air-fuel ratio of the one cylinder group and the air-fuel ratio of the other cylinder group such that an average air-fuel ratio of the one cylinder group and the other cylinder group becomes rich for a predetermined period of time. Also, when the air-fuel ratio control portion switches from the fuel cut control to the cylinder group-specific control, the air-fuel ratio control portion may make the air-fuel ratio of the one cylinder group rich and the air-fuel ratio of the other cylinder group lean for a predetermined period of time.

With the cylinder group-specific control, the air-fuel ratio control portion makes the air-fuel ratio of one cylinder group rich and makes the air-fuel ratio of another cylinder group lean. As a result, rich exhaust gas and lean exhaust gas merge at the downstream second catalyst, thereby increasing the temperature of the second catalyst. On the other hand, with the fuel cut control, the air-fuel ratio control portion stops fuel from being supplied to all of the cylinder groups. Therefore, during fuel cut control, the OSCs of all of the catalysts are at the maximum.

According to the foregoing aspect, from the very beginning of the switch to the cylinder group-specific control, the second catalyst provided in the common exhaust passage can be placed in the neutral state, thus enabling it so effectively purify exhaust gas.

In the foregoing aspect, the predetermined period of time may be set such that the oxygen storage capacity of the second catalyst becomes approximately 50%.

In the foregoing first aspect, the exhaust control portion may include a flowrate control portion that controls a flowrate of exhaust gas that flows into each of the individual exhaust passages, and an air-fuel ratio control portion that controls the air-fuel ratio of the cylinder groups independently. When the air-fuel ratio control portion switches from cylinder group-specific control that makes the air-fuel ratio of one cylinder group rich and makes the air-fuel ratio of another cylinder group lean to fuel cut control that stops fuel from being supplied to all of the cylinder groups, the flowrate control portion may control the exhaust gas flowrate such that more exhaust gas flows through the individual exhaust passage corresponding to the cylinder group in which the air-fuel ratio has been made lean by the cylinder group-specific control than flows through the individual exhaust passage corresponding to the cylinder group in which the air-fuel ratio has been made rich by the cylinder group-specific control.

In the foregoing aspect, the flowrate control portion formed using the ECU and the like controls the flowrate of exhaust gas that flows through the individual exhaust passages.

With the cylinder group-specific control, the air-fuel ratio control portion makes the air-fuel ratio of one cylinder group rich and makes the air-fuel ratio of another cylinder group lean. As a result, rich exhaust gas and lean exhaust gas merge at the downstream second catalyst, thereby increasing the temperature of the second catalyst. On the other hand, with the fuel cut control, the air-fuel ratio control portion stops fuel from being supplied to all of the cylinder groups. Therefore, during fuel cut control, the OSCs of all of the catalysts are at the maximum.

According to the foregoing aspect, the flowrate of lean exhaust gas from the fuel cut is suppressed in the cylinder group having the air-fuel ratio that was made rich in the cylinder group-specific control. As a result, it is possible to suppress the generation of heat in the first catalyst corresponding to that cylinder group, as well as the degradation of that catalyst due to that generated heat, and the like. Also, the oxygen storage state of the first catalyst corresponding to each cylinder group can be maintained even during a fuel cut so the cylinder group-specific control can be started smoothly when the fuel cut ends.

In the foregoing aspect, when the air-fuel ratio control portion switches from the cylinder group-specific control to the fuel cut control, the flowrate control portion may control the exhaust gas flowrate such that all of the exhaust gas flows through the individual exhaust passage corresponding to the cylinder group in which the air-fuel ratio was made lean by the cylinder group-specific control.

In the foregoing aspect, the flowrate control portion may include a control valve provided downstream of the first catalyst in each of the individual exhaust passages, and a connecting passage that connects the individual exhaust passages together upstream of the first catalyst in each individual exhaust passage. Also, the flowrate control portion may control the flowrate of exhaust gas into each of the individual exhaust passages by controlling the control valves open and closed.

In the foregoing aspect, the control apparatus may also include a turbocharger. In this case, a turbine of the turbocharger may be connected to the individual exhaust passage of one of the cylinder groups.

A second aspect of the invention relates to a control method of an internal combustion engine provided with a plurality of cylinder groups, an individual exhaust passage connected to each cylinder group, a common exhaust passage connecting the individual exhaust passages, a first catalyst provided in each of the individual exhaust passages, and a second catalyst provided in the common exhaust passage. This control method includes controlling a state of exhaust gas that flows into the first catalysts and the second catalyst such that an oxygen storage capacity of at least one catalyst of the first catalysts and the second catalyst becomes a predetermined oxygen storage capacity when control of an operating state of the internal combustion engine is switched.

In the second aspect of the invention, when the operating state of the internal combustion engine is switched from cylinder group-specific control that makes an air-fuel ratio of one cylinder group rich and makes the air-fuel ratio of another cylinder group lean to stoichiometric control that makes the air-fuel ratios of all of the cylinder groups the stoichiometric air-fuel ratio, the switch to the stoichiometric control may be made after making the air-fuel ratio of the cylinder group that was made rich by the cylinder group-specific control lean for a predetermined period of time and making the air-fuel ratio of the cylinder group that was made lean by the cylinder group-specific control rich for the predetermined period of time.

In the second aspect of the invention, when the operating state of the internal combustion engine is switched from fuel cut control that stops fuel from being supplied to all of the cylinder groups to cylinder group-specific control that makes an air-fuel ratio of one cylinder group rich and makes the air-fuel ratio of another cylinder group lean, the air-fuel ratio of the one cylinder group and the air-fuel ratio of the other cylinder group may be set such that the air-fuel ratio of the common exhaust passage becomes rich for a predetermined period of time.

In the second aspect of the invention, when the operating state of the internal combustion engine is switched from cylinder group-specific control that makes an air-fuel ratio of one cylinder group rich and makes the air-fuel ratio of another cylinder group lean to fuel cut control that stops fuel from being supplied to all of the cylinder groups, an exhaust gas flowrate may be controlled such that more exhaust gas flows through the individual exhaust passage corresponding to the cylinder group in which the air-fuel ratio has been made lean by the cylinder group-specific control than flows through the individual exhaust passage corresponding to the cylinder group in which the air-fuel ratio has been made rich by the cylinder group-specific control.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF THE PREFERRED EMBODIMENTS

In the following description and the accompanying drawings, the present invention will be described in more detail in terms of example embodiments.

Figure 1:
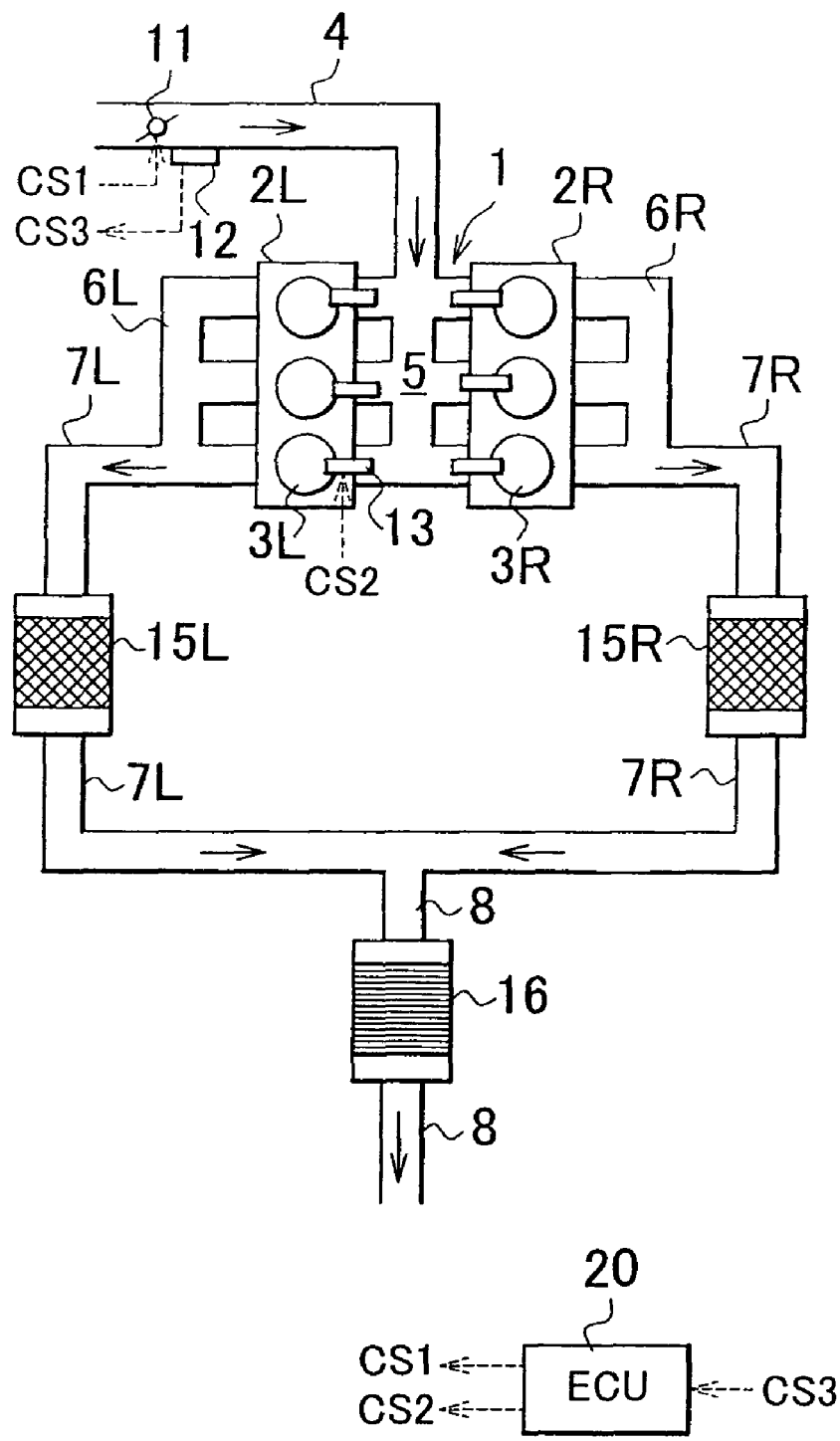
FIG. 1 is a block diagram schematically showing a control apparatus of an internal combustion engine according to a first example embodiment of the invention.

FIG. 1 is a block diagram schematically showing a control apparatus of an internal combustion engine according to a first example embodiment of the invention. In the drawing, the solid arrows indicate the flow of intake and exhaust gases, and the broken arrows indicate the input and output of signals. Also, in the following description, when it is necessary to distinguish between left and right constituent elements, the letter "L" or "R" will be appended to the reference numeral. When it is not necessary to make this distinction, the letter will be omitted.

The internal combustion engine 1 is a V-type six cylinder engine having two (a left and a right) banks (i.e., cylinder groups) 2 each having three cylinders 3. More specifically, the left bank 2L has three cylinders 3L and the right bank 2R has three cylinders 3R.

A throttle valve 11, an airflow meter 12, and an air cleaner, not shown, and the like are provided in an intake passage 4 for leading intake air into each cylinder 3. The intake passage 4 is connected to an intake manifold 5. The opening amount of the throttle valve 11 is controlled based on a control signal CS1 from an ECU 20, and controls the flowrate of intake air that flows into the intake passage 4. The airflow meter 12 detects the intake air flowrate downstream of the throttle valve 11 and supplies a signal CS3 indicative of that flowrate to the ECU 20.

A fuel injection valve 13 is provided in each cylinder 3. The fuel injection valve 13 controls the fuel injection quantity based on a control signal CS2 from the ECU 20. Incidentally, the fuel injection valve 13 may be either a port injection type fuel injection valve or an in-cylinder injection type fuel injection valve.

Exhaust manifolds 6L and 6R of the banks 2L and 2R are connected to exhaust passages 7L and 7R, respectively. A start catalyst 15L is provided in the exhaust passage 7L and a start catalyst 15R is provided in the exhaust catalyst 7R. The exhaust passages 7L and 7R merge downstream of the start catalysts 15L and 15R, where they are connected to a common exhaust passage 8. An under floor (UF) catalyst 16 is provided in this common exhaust passage 8. Incidentally, the types of the start catalysts 15 and the UF catalyst 16 are not particularly limited. For example, the start catalysts 15 may be three-way catalysts and the UF catalyst 16 may be a $NO_x$ storage-reduction catalyst.

The ECU 20 controls various components of the internal combustion engine 1. In particular, the ECU 20 functions as an air-fuel ratio control portion of the invention, in which it controls the air-fuel ratio (A/F) of the two cylinder banks 2 according to the operating state of the internal combustion engine 1 such as cylinder-specific rich/lean control, stoichiometric control, and fuel cut control, as will be described later. Incidentally, the ECU 20 controls the air-fuel ratio of each bank 2 by outputting the control signals CS1 and CS2 based on the detection signal CS3 output by the airflow meter 12 and the like, and adjusting the opening amount of the throttle valve 11 and the fuel injection quantity from the fuel injection valve 13 and the like.

Each exhaust passage 7R and 7L corresponds to an individual exhaust passage of the invention. Also, each start catalyst 15 corresponds to a first catalyst of the invention, and the UF catalyst 16 corresponds to a second catalyst of the invention.

Next, catalyst temperature increase control according to the first example embodiment will be described. In the first example embodiment, this catalyst temperature increase control is used to control the air-fuel ratio of each bank 2 when the internal combustion engine shifts from bank-specific rich/lean control (hereinafter referred to as "bank-specific RL control") (i.e., control in which the air-fuel ratio in each bank is controlled independently) to stoichiometric operation. More specifically, the bank-specific RL control increases the temperature of the UF catalyst by making the air-fuel ratio of a first bank 2 rich while making the air-fuel ratio of a second bank 2 lean and merging the rich exhaust gas and the lean exhaust gas at the UF catalyst 16 in the common exhaust passage 8. Meanwhile, stoichiometric operation refers to the internal combustion engine operating in a state in which the air-fuel ratios of both the left and right banks 2 are maintained at the stoichiometric air-fuel ratio.

Because during bank-specific RL control the air-fuel ratio of the first bank is made rich, the oxygen storage capacity (OSC) of that bank (hereinafter referred to as the "rich burn bank") is the minimum. At the same time, the air-fuel ratio of the second bank is made lean so the oxygen storage capacity of that bank (hereinafter referred to as the "lean burn bank") is the maximum. Thereafter, when the internal combustion engine shifts from bank-specific RL control to stoichiometric operation, the air-fuel ratio of the banks 2 needs to quickly be made neutral, or more specifically, the oxygen storage capacity needs to quickly be made approximately 50%, in order to maximize activity of the start catalysts 15. Therefore, in this example embodiment, when the internal combustion engine is shifted from bank-specific RL control to stoichiometric operation, first the air-fuel ratio of the rich burn bank is temporarily made lean and the air-fuel ratio of the lean burn bank is temporarily made rich for a predetermined period of time.

Figure 2:
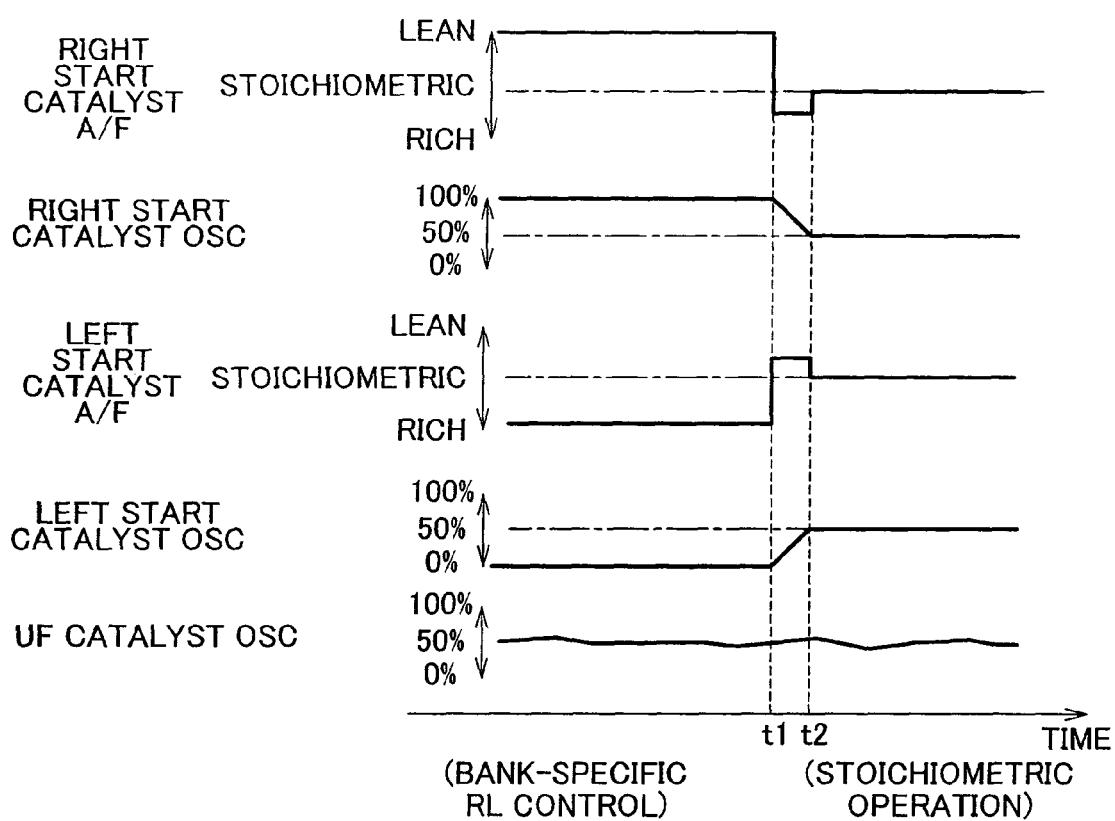
FIG. 2 is an example timing chart of catalyst temperature increase control according to the first example embodiment.

FIG. 2 is an example timing chart of catalyst temperature increase control according to this example embodiment. In FIG. 2, bank-specific RL control is performed until time t1 and stoichiometric operation is performed from time t2 on.

In this example, the right bank 2R is the lean burn bank so the A/F of the right start catalyst 15R is lean and the OSC of the right start catalyst 15R is the maximum (100%). On the other hand, the left bank 2L is the rich burn bank so the A/F of the left start catalyst 15L is rich and the OSC of the left start catalyst 15L is the minimum (0%). Incidentally, the UF catalyst 16 is arranged in the common exhaust passage 8 so the OSC of the UF catalyst 16 is around 50%.

When the internal combustion engine shifts from the bank-specific RL control to stoichiometric operation at time t1, the ECU 20 first temporarily makes the air-fuel ratio of the right start catalyst 15R on the right bank 2R side, which is the lean burn bank, a predetermined rich A/F for a predetermined time until time t2. As a result, the OSC of the right start catalyst 15R drops from 100% to 50%. Accordingly, the right start catalyst 15R is in a neutral state in which the catalyst is highly active, i.e., the OSC is approximately 50%, at time t2. In this way, after time t2 when the right start catalyst 15R is in a neutral state, the ECU 20 sets the A/F of the right bank 2R side to the stoichiometric air-fuel ratio so that stoichiometric operation is performed.

At the same time, at time t1 the ECU 20 temporarily makes the air-fuel ratio of the left start catalyst 15L on the left bank 2L side, which is the rich burn bank, a predetermined lean A/F for a predetermined period of time until time t2. As a result, the OSC of the left start catalyst 15L rises from 0% to approximately 50% so that at time t2 the left start catalyst 15L is in a neutral state in which the catalyst is highly active. In this way, after time t2 when the left start catalyst 15L is in a neutral state, the ECU 20 sets the A/F of the left bank 2L side to the stoichiometric air-fuel ratio so that stoichiometric operation is performed.

Incidentally, the predetermined period of time, i.e., the period of time between time t1 and time t2, and the predetermined A/F during that period of time are determined so that the OSC of each start catalyst becomes approximately 50% after that predetermined period of time.

Figure 3:
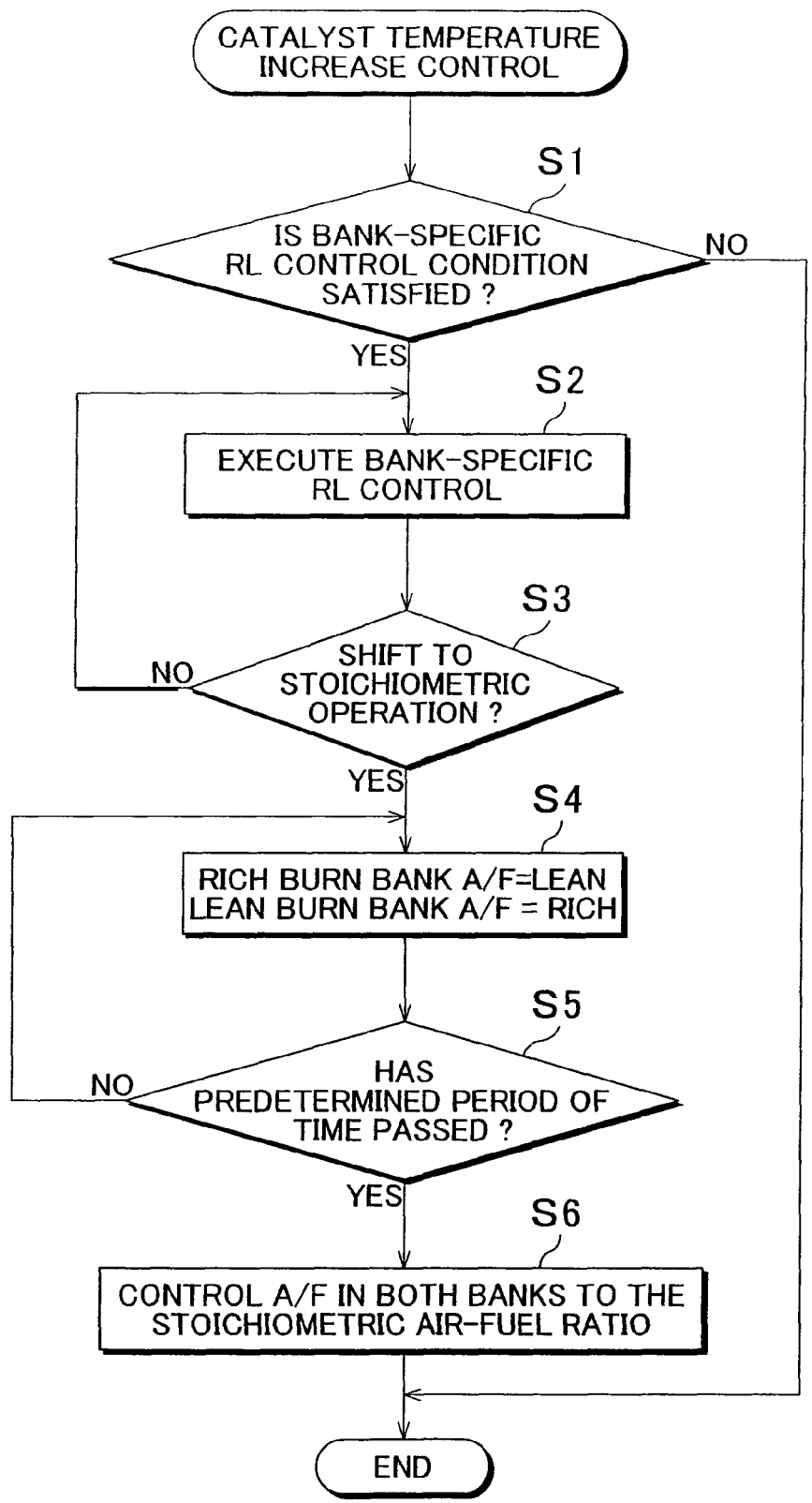
FIG. 3 is a flowchart of the catalyst temperature increase control according to the first example embodiment.

FIG. 3 is a flowchart of catalyst temperature increase control according to this example embodiment. This control is realized by the ECU 20 executing a program stored internally beforehand.

First, the ECU 20 determines whether a bank-specific RL control execution condition is satisfied (step S1). If the condition is satisfied, the ECU 20 executes the bank-specific RL control (step S2).

Next, the ECU 20 determines whether a condition to shift into stoichiometric operation is satisfied (step S3). If this condition is not satisfied, the bank-specific RL control executed in step S2 is continued. On the other hand, if the condition to shift into stoichiometric operation is satisfied (i.e., Yes in step S3), the ECU 20 makes the A/F on the rich burn bank side lean and makes the A/F on the lean burn bank side rich (step S4). Then when a predetermined period of time (i.e., the period of time between time t1 and time t2 in FIG. 2) has passed (i.e., YES in step S5), the ECU 20 makes the A/F in both banks the stoichiometric air-fuel ratio so that stoichiometric operation is performed (step S6).

In this way, according to this example embodiment, when the operating state of the internal combustion engine is shifted from the bank-specific RL control to stoichiometric operation, the start catalysts 15 of the banks 2 can both be placed in neutral states by temporarily making the A/F of the rich burn bank lean and making the A/F of the lean burn bank rich. Accordingly, the start catalysts 15 are able to maximally demonstrate their abilities to purify exhaust gas from the time stoichiometric operation starts thereafter.

Next, a second example embodiment of the invention will be described. The structure of the control apparatus of an internal combustion engine according to this second example embodiment is the same as that of the control apparatus according to the first example embodiment shown in FIG. 1 so a description thereof will be omitted.

In the second example embodiment, the downstream UF catalyst 16 is in a neutral state, with the average A/F of the two start catalysts 15 being rich for a predetermined period of time (hereinafter also referred to as the "average rich period") when the operating state of the internal combustion engine 1 shifts from fuel cut control to the bank-specific RL control described above. Here, fuel cut control refers to control that stops fuel injection from the fuel injection valve 13 when the vehicle is decelerating, e.g., when the speed of the internal combustion engine is equal to or less than a predetermined value and the accelerator opening amount is zero. Also, the term "neutral state" here refers to a state in which the OSC of the UF catalyst 16 is approximately 50%, just as described above.

Figure 4:
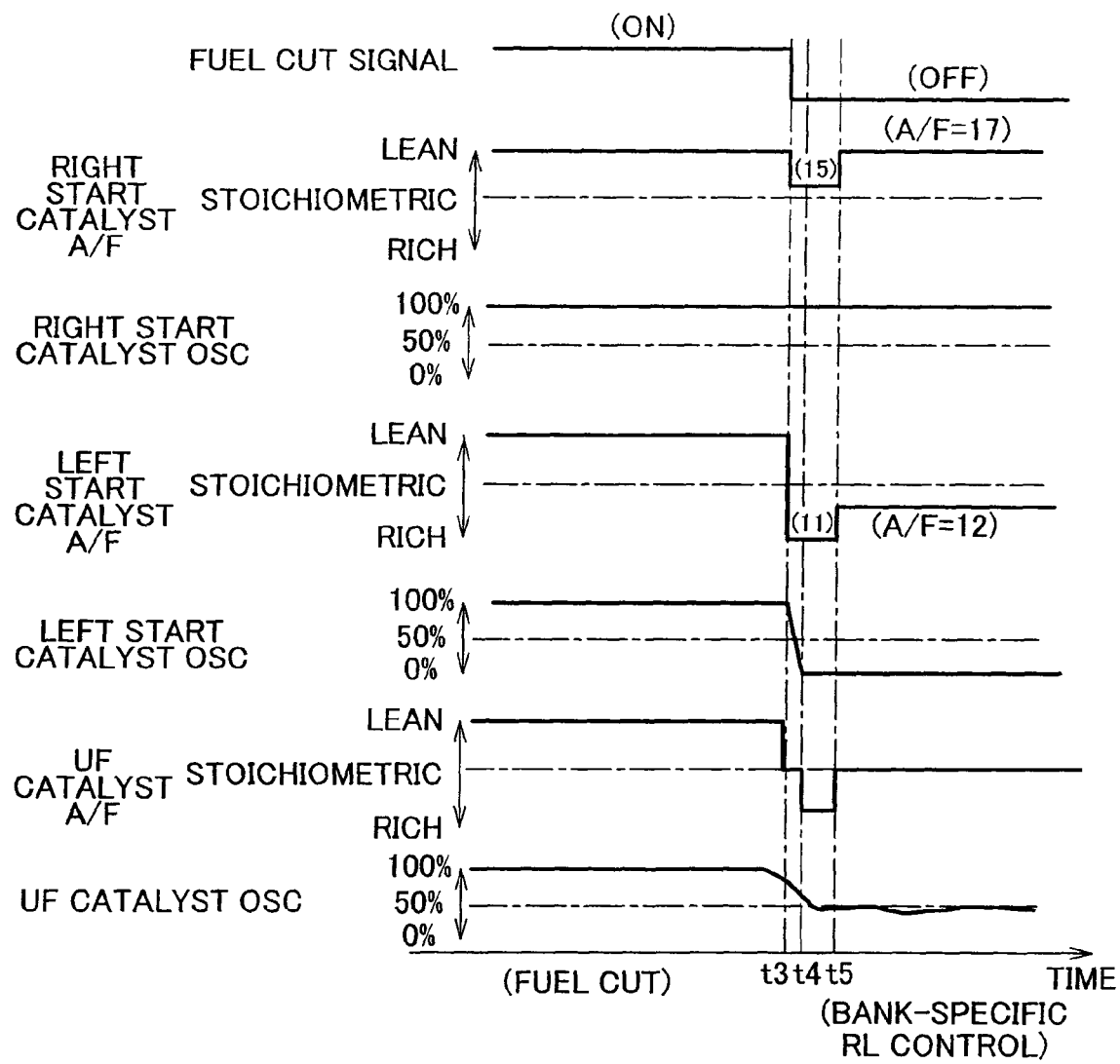
FIG. 4 is an example timing chart of catalyst temperature increase control according to a second example embodiment of the invention.

FIG. 4 is an example timing chart of a catalyst temperature increase control according to this second example embodiment. In FIG. 4, before time t3, the operating state of the internal combustion engine 1 is such that a fuel cut is being executed, the A/F of both the left and right banks 2 is lean, and the OSC of both the left and right start catalysts 15 is the maximum (100%). Therefore, the A/F of the exhaust gas that flows into the UF catalyst 16 which is downstream of the left and right start catalysts 16 is also lean so the OSC of the UF catalyst 16 is also the maximum.

At time t3 when the fuel cut ends, the condition to start the bank-specific RL control is satisfied, and the fuel cut signal turns off, the ECU 20 makes the A/F of the right bank 2R, which is to be the lean burn bank in the bank-specific RL control thereafter, slightly lean (i.e., an A/F that is somewhat leaner than the stoichiometric air-fuel ratio) (for example, A/F=15). Also, the ECU 20 also makes the A/F of the left bank 2L, which is to be the rich burn bank in the bank-specific RL control thereafter, very rich (for example, A/F=11). Then at time t5 when the predetermined period of time has passed, the ECU 20 execute the bank-specific RL control and makes the A/F of the right bank 2R lean (for example, A/F=17) and makes the A/F of the left bank 2L rich (for example, A/F 12).

Accordingly, between time t3 and time t5, the A/F of the UF catalyst 16 changes from lean to rich (i.e., crosses the stoichiometric air-fuel ratio) such that the OSC of the UF catalyst 16 becomes approximately 50%. That is, the UF catalyst 16 comes to be in a neutral state in which the catalyst is highly active. Accordingly, the UF catalyst 16 is able to effectively demonstrate the ability to purify exhaust gas with the bank-specific RL control thereafter.

Incidentally, when the bank-specific RL control is performed after a fuel cut, the UF catalyst 16 can be shifted more quickly into the neutral state by making the A/F of both the left and right banks rich within a predetermined period of time (i.e., between time t3 and time t5). However, if this is done, the air-fuel ratio of the start catalyst of the lean burn bank (i.e., the start catalyst 15R in this example) returns to being lean again by the bank-specific RL control after having been made rich, which generates unnecessary heat that causes thermal degradation of the catalyst and reduces fuel efficiency. Also, while rich, the OSC is falls below 100% so the start catalyst 15R stores oxygen to return to the OSC to 100% at the start of bank-specific RL control. During that time, therefore, the A/F of the exhaust gas that flows into the UF catalyst 16 ends up being rich by a corresponding amount. Therefore, in this example embodiment, the A/F of the lean burn bank in the bank-specific RL control that follows is maintained slightly leaner than the stoichiometric air-fuel ratio instead of being made rich, and the A/F on the rich burn bank side is made very rich so that the overall A/F (i.e., the average A/F) is rich.

Figure 5:
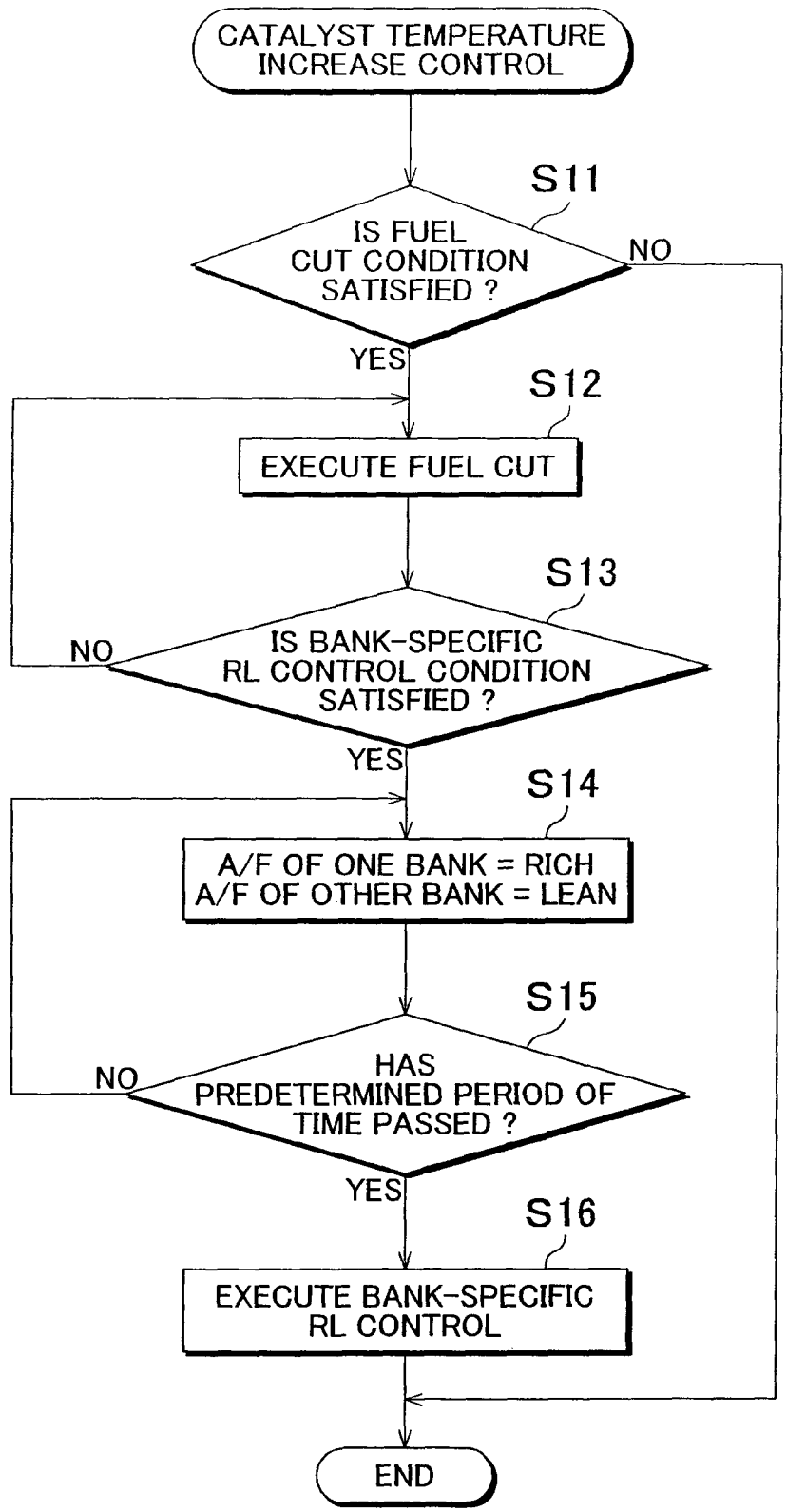
FIG. 5 is a flowchart of the temperature increase control according to the second example embodiment.

FIG. 5 is a flowchart of the catalyst temperature increase control according to the second example embodiment. This control is executed by the ECU 20.

First, the ECU 20 determines whether a fuel cut condition is satisfied (step S11). If the fuel cut condition is satisfied, the ECU 20 executes a fuel cut (step S12). Next, the ECU 20 determines whether a bank-specific RL control execution condition is satisfied (step S13). If the bank-specific RL control execution condition is not satisfied, the ECU 20 continues the fuel cut executed in step S12. On the other hand, if the bank-specific RL control execution condition is satisfied (i.e., Yes in step S13), the ECU 20 makes the A/F of a first bank 2, i.e., the bank 2 that is to be the rich burn bank in the bank-specific RL control to follow, rich and makes the A/F of a second bank 2, i.e., the bank 2 that is to be the lean burn bank in the bank-specific RL control to follow, lean (step S14). Then when a predetermined period of time (i.e., the period of time between time t3 and time t5 in FIG. 4) has passed (i.e., Yes in step S15), the ECU 20 executes the bank-specific RL control (step S16). That is, in this example, the ECU 20 makes the A/F of the bank 2R, which is the lean burn bank, lean and makes the A/F of the bank 2L, which is the rich burn bank, rich.

As described above, in the second example embodiment the downstream UF catalyst 16 is placed in a neutral state by making the average A/F of the left and right banks rich for a predetermined period of time when the operating state of the internal combustion engine shifts from fuel cut control to bank-specific RL control. Accordingly, the ability of the UF catalyst 16 to purify exhaust gas is able to be utilized effectively when the bank-specific RL control starts thereafter.

Incidentally, in actuality, the ECU 20 controls the A/F of each bank by adjusting the throttle opening amount, the fuel injection quantity, and the like referencing a rich/lean operating map prepared in advance. In this case, normally a plurality of operating maps corresponding to combinations of specific rich and lean A/F values are prepared beforehand in the ECU 20. For example, a plurality of operating maps, such as an operating map for A/F values of "12" and "17" and an operating map for A/F values of "11" and "18", are prepared. The reason for preparing a plurality of operating maps is so that the heat quantity of the UF catalyst 16 can be changed using different operating maps.

In this way, when a plurality of rich/lean operating maps are stored in the ECU 20, the control during the average rich period in the second example embodiment described above can use combinations of A/F values belonging to the plurality of operating maps. For example, when an operating map with A/F values of "12" and "17" and an operating map with A/F values of "11" and "18" are prepared, the ECU 20 can use the operating map with the A/F value of "11" for the rich side and the operating map with the A/F value of "17" for the lean side during the predetermined period of time, i.e., during the average rich period (i.e., between time t3 and time t5) in FIG. 4. Accordingly, there is no need to prepare a special operating map, and store that special operating map in the ECU 20, just for control during the average rich period of this example embodiment.

Figure 6:
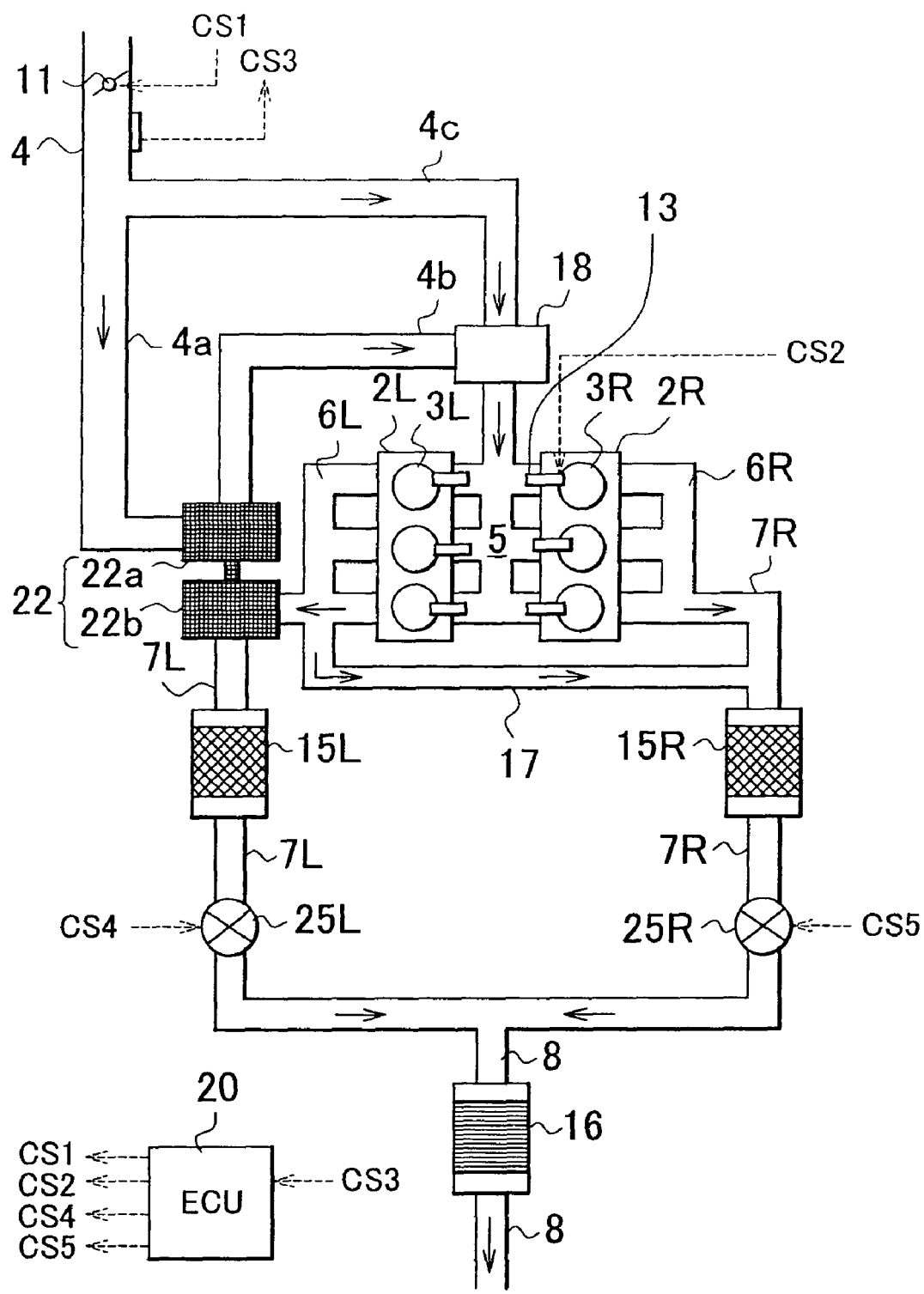
FIG. 6 is a block diagram schematically showing a control apparatus of an internal combustion engine according to a third example embodiment of the invention.

Next, a third example embodiment of the invention will be described. FIG. 6 is a block diagram schematically showing a control apparatus of an internal combustion engine according to the third example embodiment. The control apparatus of an internal combustion engine according to this third example embodiment has the same basic structure as the control apparatus of an internal combustion engine according to the first and second example embodiments shown in FIG. 1 with the following exceptions. First, a turbocharger 22 is provided in the left bank 2L. Accordingly, the intake passage 4 branches off into branch passages 4a and 4c downstream of the throttle valve 11. The branch passage 4a is connected to a passage 4b via a compressor 22a of the turbocharger 22. The passage 4b is connected to an intercooler 18. On the other hand, a turbocharger is not provided for the right bank 2R. Instead, the branch passage 4c is connected directly to the intercooler 18 which is connected to the intake manifold 5.

Also, the exhaust manifold 6L of the bank 2L is connected to a turbine 22b of the turbocharger 22, and also connected to the exhaust passage 7R of the right bank 2R via a communicating passage 17.

Moreover, a control valve 25 is provided downstream of the start catalyst 15 in the exhaust passage 7 of each bank 2. The control valve 25 and the communicating passage 17 serve to control the flowrate of the exhaust gas that flows through the exhaust passages 7. More specifically, when both of the control valves 25R and 25L are open, exhaust gas flows from the banks 2 through the exhaust passages. On the other hand, when the control valve 25L is closed and the control valve 25R is open, exhaust gas from the left bank 2L does not flow through the exhaust passage 7L but instead flows through the communicating passage 17 and then through the exhaust passage 7R on the right bank 2R side, as shown by the arrow in the communicating passage 17 in FIG. 6. Conversely, when the control valve 25L is open and the control valve 25R is closed, exhaust gas from the right bank 2R does not flow through the exhaust passage 7R but instead flows through the communicating passage 17 and then through the exhaust passage 7L on the left bank 2L side. The control valves 25L and 25R are controlled open and closed by control signals CS4 and CS5 supplied from the ECU 20.

Aside from the foregoing points, the control apparatus of an internal combustion engine is the same as the control apparatus of an internal combustion engine shown in FIG. 1. Incidentally, the communicating passage 17, the control valves 25L and 25R, and the ECU 20 operate as a flowrate control portion of the invention.

Next, catalyst temperature increase control according to the third example embodiment will be described. In this example embodiment, the flowrate of exhaust gas into the exhaust passage 7 on the lean burn bank side is made larger than the flowrate of exhaust gas into the exhaust passage 7 on the rich burn bank side when the operating state of the internal combustion engine 1 is shifted from bank-specific RL control to fuel cut control.

While bank-specific RL control is being executed, the OSC of the start catalyst 15 on the lean burn bank side is the maximum (100%) and the OSC of the start catalyst 15 on the rich burn bank side is the minimum (0%). Here, when a fuel cut is executed, lean exhaust gas flows into the exhaust passages of both banks so the OSC of the start catalyst on the rich burn bank side increases from the minimum to the maximum which has adverse effects, such as the catalyst degrades due to excess heat being generated. Therefore, when the operating state of the internal combustion engine 1 is shifted from bank-specific RL control to fuel cut control, the exhaust gas flowrate is adjusted so that the flowrate of exhaust gas into the lean burn bank side increases. As a result, the flowrate of exhaust gas into the rich burn bank side decreases, thereby reducing the heat that is generated as described above. In actuality, the exhaust gas flowrate is adjusted by supplying the control signals CS4 and CS5 to the control valves 25L and 25R.

Figure 7:
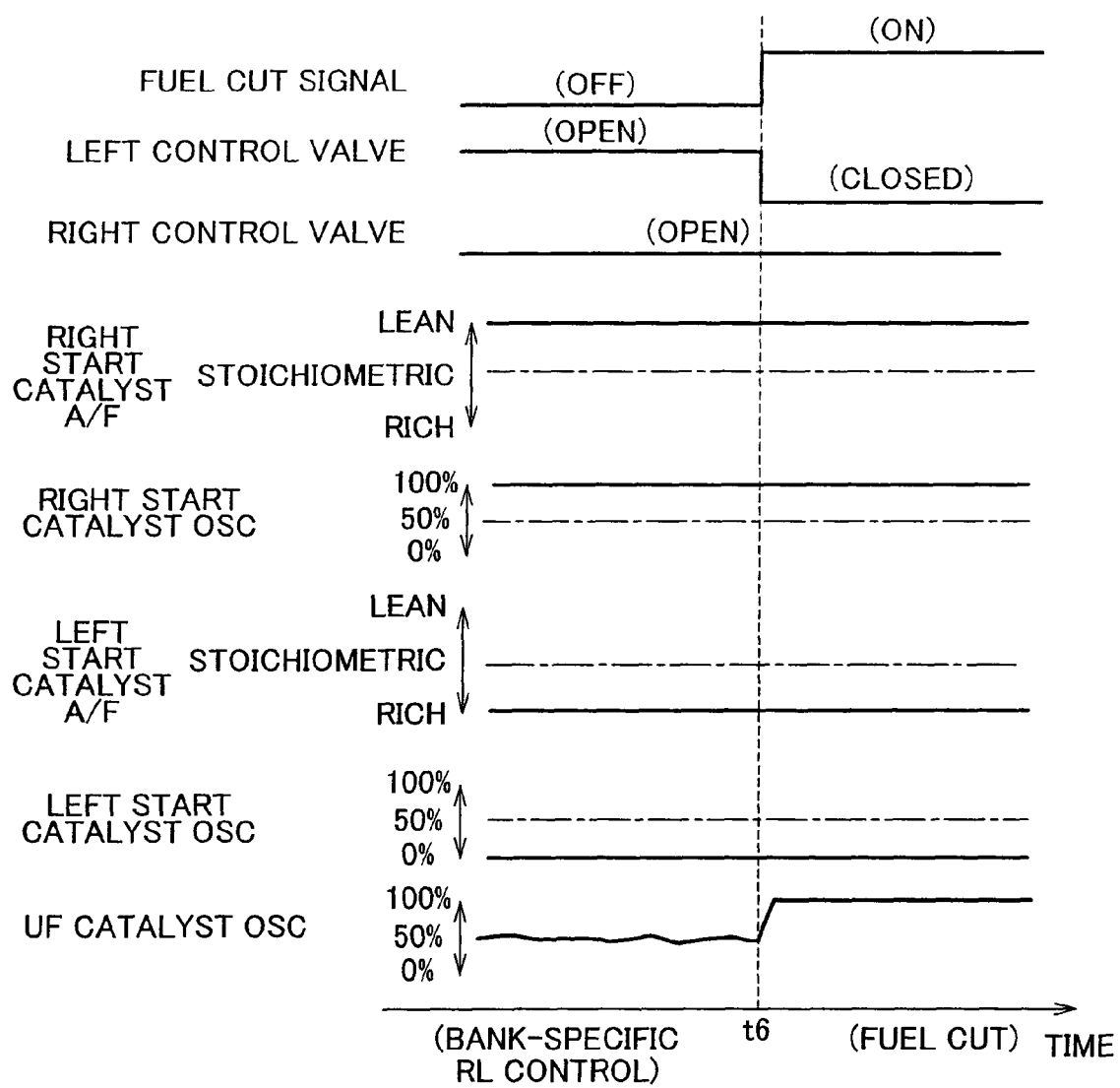
FIG. 7 is an example timing chart of catalyst temperature increase control according to the third example embodiment.

FIG. 7 is an example timing chart of the catalyst temperature increase control according to this example embodiment. Before time t6, bank-specific RL control is executed in the internal combustion engine, and after time t6, a fuel cut is executed. The bank-specific RL control that is performed before time t6 is such that the A/F of the lean burn bank 2R is lean so the OSC of the corresponding start catalyst 15R is the maximum (100%). Also, the A/F of the rich burn bank 2L is rich so the OSC of the corresponding start catalyst 15L is the minimum (0%). The OSC of the UF catalyst 16 is maintained in the neutral state (at approximately 50%). Also, the fuel cut signal is off and the right and left control valves 25L and 25R are both open. Accordingly, the exhaust gas from both of the banks 2 flows into the exhaust passages 7.

At time t6, when the fuel cut condition is satisfied and the fuel cut signal turns on, the ECU 20 closes the left control valve 25L. Accordingly, as described above, exhaust gas from the left bank 2L flows through the communicating passage 17 and into the exhaust passage 7R of the right bank 2R. The exhaust gas in both the left and right banks are lean while a fuel cut is being executed. However, the control valves 25L and 25R are controlled so that this lean exhaust gas all flows into the exhaust passage 7R on the lean burn bank 2R side. In this way, lean exhaust gas is inhibited from flowing into the start catalyst 15L on the rich burn bank 2L side, thus suppressing heat from being generated. Also, the A/F on the rich burn bank 2L side is maintained rich so the OSC of the start catalyst 15L is also maintained at the minimum. As a result, when the fuel cut ends, the bank-specific RL control can be immediately started again.

Figure 8:
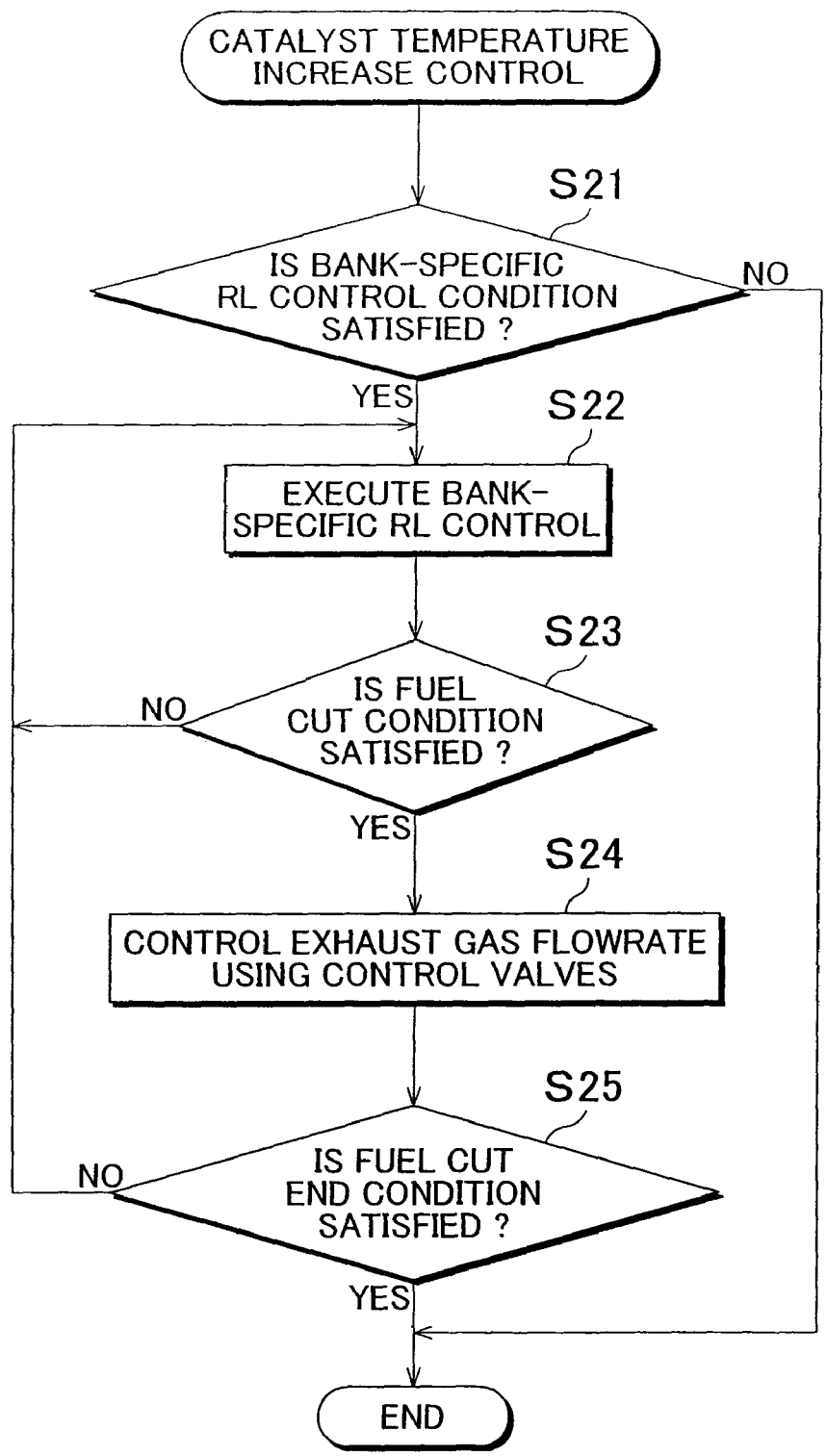
FIG. 8 is a flowchart of the catalyst temperature increase control according to the third example embodiment.

FIG. 8 is a flowchart of the catalyst temperature increase control according to the third example embodiment. This control is executed by the ECU 20.

First, the ECU determines whether a bank-specific RL control execution condition is satisfied (step S21). If the bank-specific RL control execution condition is satisfied, the ECU 20 executes the bank-specific RL control (step S22). Next, the ECU 20 determines whether a fuel cut condition is satisfied (step S23). If the fuel cut condition is not satisfied, the ECU 20 continues to execute the bank-specific RL control. On the other hand, if the fuel cut condition is satisfied (i.e., Yes in step S23), the ECU 20 controls the control valves 25 to make the exhaust gas flowrate in the exhaust passage on the lean burn bank side greater than the exhaust gas flowrate in the exhaust passage on the rich burn bank side (step S24). Then the ECU 20 determines whether a fuel cut end condition is satisfied (step S25). If the fuel cut end condition is satisfied, the ECU 20 ends the fuel cut and starts the bank-specific RL control.

As described above, in this example embodiment, when the internal combustion engine is shifted from bank-specific RL control to fuel cut control, the exhaust gas flowrate is controlled so that the exhaust gas flowrate in the exhaust passage on the lean burn bank side becomes greater than the exhaust gas flowrate in the exhaust passage on the rich burn bank side, or, so that all of the exhaust gas on the rich burn bank side flows into the exhaust passage on the lean burn bank side. As a result, during a fuel cut the start catalyst on the rich burn bank side can be prevented from generating heat and bank-specific RL control can be smoothly started after a fuel cut.

Incidentally, in the invention, the control when switching from cylinder group-specific control to stoichiometric control, the control when switching from fuel cut control to cylinder group-specific control, and the control when switching from cylinder group-specific control to fuel cut control were realized in separate example embodiments. However, the controls in the first to the third example embodiments may also be combined. For example, the control apparatus may be structured like the apparatus in the third example embodiment, and the control according to the first example embodiment may be performed when switching from the cylinder group-specific control to the stoichiometric control, the control according to the second example embodiment may be performed when switching from the fuel cut control to the cylinder group-specific control, and the control according to the third example embodiment may be performed when switching from the cylinder group-specific control to the fuel cut control.

While the invention has been described with reference to example embodiments thereof, it is to be understood that the invention is not limited to the example embodiments or constructions. To the contrary, the invention is intended to cover various modifications and equivalent arrangements. In addition, while the various elements of the example embodiments are shown in various combinations and configurations, which are exemplary, other combinations and configurations, including more, less or only a single element, are also within the spirit and scope of the invention.

The invention claimed is:

1. A control apparatus of an internal combustion engine provided with a plurality of cylinder groups, comprising:
    an individual exhaust passage connected to each cylinder group;
    a common exhaust passage connecting the individual exhaust passages;
    a first catalyst provided in each of the individual exhaust passages;
    a second catalyst provided in the common exhaust passage; and
    an exhaust control portion that controls a state of exhaust gas flowing into the first catalysts and the second catalyst, wherein
    when control of an operating state of the internal combustion engine is switched, the exhaust control portion controls the state of the exhaust gas such that an oxygen storage capacity of at least one catalyst of the first catalysts and the second catalyst becomes a predetermined oxygen storage capacity, wherein
    the exhaust control portion is an air-fuel ratio control portion that controls an air-fuel ratio of each of the cylinder groups independently, and when the air-fuel ratio control portion switches from a fuel cut control that stops fuel from being supplied to all of the cylinder groups to a cylinder group-specific control that makes the air-fuel ratio of one cylinder group rich and makes the air-fuel ratio of another cylinder group lean, the air-fuel ratio control portion sets the air-fuel ratio of the one cylinder group and the air-fuel ratio of the other cylinder group such that the air-fuel ratio of the common exhaust passage becomes rich for a predetermined period of time.

2. The control apparatus according to claim 1, wherein when the air-fuel ratio control portion switches from the fuel cut control to the cylinder group-specific control, the air-fuel ratio control portion sets the air-fuel ratio of the one cylinder group and the air-fuel ratio of the other cylinder group such that an average air-fuel ratio of the one cylinder group and the other cylinder group becomes rich for a predetermined period of time.

3. The control apparatus according to claim 1, wherein when the air-fuel ratio control portion switches from the fuel cut control to the cylinder group-specific control, the air-fuel ratio control portion makes the air-fuel ratio of the one cylinder group rich and the air-fuel ratio of the other cylinder group lean for a predetermined period of time.

4. The control apparatus according to claim 1, wherein the predetermined period of time is set such that the oxygen storage capacity of the second catalyst becomes approximately 50% to bring the second catalyst to a neutral state.

5. A control apparatus of an internal combustion engine provided with a plurality of cylinder groups, comprising:
  an individual exhaust passage connected to each cylinder group;
  a common exhaust passage connecting the individual exhaust passages;
  a first catalyst provided in each of the individual exhaust passages;
  a second catalyst provided in the common exhaust passage; and
  an exhaust control portion that controls a state of exhaust gas flowing into the first catalysts and the second catalyst, wherein
  when control of an operating state of the internal combustion engine is switched, the exhaust control portion controls the state of the exhaust gas such that an oxygen storage capacity of at least one catalyst of the first catalysts and the second catalyst becomes a predetermined oxygen storage capacity, and
  the exhaust control portion is an air-fuel ratio control portion that controls an air-fuel ratio of each of the cylinder groups independently, and when the air-fuel ratio control portion switches from a cylinder group-specific control that makes the air-fuel ratio of one cylinder group rich and makes the air-fuel ratio of another cylinder group lean to a stoichiometric control that makes the air-fuel ratios of all of the cylinder groups a stoichiometric air-fuel ratio, the air-fuel ratio control portion makes the switch to the stoichiometric control after making the air-fuel ratio of the cylinder group that was made rich by the cylinder group-specific control lean for a predetermined period of time and making the air-fuel ratio of the cylinder group that was made lean by the cylinder group-specific control rich for the predetermined period of time.

6. The control apparatus according to claim 5, wherein the predetermined period of time, and the air-fuel ratio of the each cylinder group during the predetermined period of time are set such that the oxygen storage capacity of each of the first catalysts becomes approximately 50% to bring each of the first catalysts to a neutral state.

7. The control apparatus according to claim 5, wherein the predetermined period of time is set such that the oxygen storage capacity of the second catalyst becomes approximately 50% to bring the second catalyst to a neutral state.

8. The control apparatus according to claim 5, further comprising:
  an electronic control unit including a processor and memory providing the exhaust control portion.

9. The control apparatus according to claim 8, wherein:
  the electronic control unit is configured to receive a detection signal of an airflow meter provided downstream of a throttle valve, and
  the electronic control unit is configured to output control signals to the throttle valve and a fuel injector.

10. The control apparatus according to claim 9, wherein:
  a control valve is provided in each of the individual exhaust passages downstream of each of the first catalysts and upstream of where the individual exhaust passages join to form the common exhaust passage, wherein
  the electronic control unit is further configured to output control signals to the control valves provided.

11. A control apparatus of an internal combustion engine provided with a plurality of cylinder groups, comprising:
  an individual exhaust passage connected to each cylinder group;
  a common exhaust passage connecting the individual exhaust passages;
  a first catalyst provided in each of the individual exhaust passages;
  a second catalyst provided in the common exhaust passage; and
  an exhaust control portion that controls a state of exhaust gas flowing into the first catalysts and the second catalyst, wherein
  when control of an operating state of the internal combustion engine is switched, the exhaust control portion controls the state of the exhaust gas such that an oxygen storage capacity of at least one catalyst of the first catalysts and the second catalyst becomes a predetermined oxygen storage capacity, wherein
  the exhaust control portion includes a flowrate control portion that controls a flowrate of exhaust gas that flows into each of the individual exhaust passages, and an air-fuel ratio control portion that controls the air-fuel ratio of the cylinder groups independently, and when the air-fuel ratio control portion switches from a cylinder group-specific control that makes the air-fuel ratio of one cylinder group rich and makes the air-fuel ratio of another cylinder group lean to a fuel cut control that stops fuel from being supplied to all of the cylinder groups, the flowrate control portion controls the exhaust gas flowrate such that more exhaust gas flows through the individual exhaust passage corresponding to the cylinder group in which the air-fuel ratio has been made lean by the cylinder group-specific control than flows through the individual exhaust passage corresponding to the cylinder group in which the air-fuel ratio has been made rich by the cylinder group-specific control.

12. The control apparatus according to claim 11, wherein when the air-fuel ratio control portion switches from the cylinder group-specific control to the fuel cut control, the flowrate control portion controls the exhaust gas flowrate such that all of the exhaust gas flows through the individual exhaust passage corresponding to the cylinder group in which the air-fuel ratio was made lean by the cylinder group-specific control.

13. The control apparatus according to claim 11, wherein the flowrate control portion i) includes a control valve provided downstream of the first catalyst in each of the individual exhaust passages, and a connecting passage that connects the individual exhaust passages together upstream of the first catalyst in each individual exhaust passage, and ii) controls the flowrate of exhaust gas into each of the individual exhaust passages by controlling the control valves open and closed.

14. The control apparatus according to claim 11, further comprising:
  a turbocharger, wherein a turbine of the turbocharger is connected to the individual exhaust passage of one of the cylinder groups.

15. A control method of an internal combustion engine provided with a plurality of cylinder groups, an individual exhaust passage connected to each cylinder group, a common exhaust passage connecting the individual exhaust passages, a first catalyst provided in each of the individual exhaust passages, and a second catalyst provided in the common exhaust passage, comprising:
  controlling a state of exhaust gas that flows into the first catalysts and the second catalyst such that an oxygen storage capacity of at least one catalyst of the first catalysts and the second catalyst becomes a predetermined oxygen storage capacity when control of an operating state of the internal combustion engine is switched, wherein when the operating state of the internal combustion engine is switched from a cylinder group-specific control that makes an air-fuel ratio of one cylinder group rich and makes the air-fuel ratio of another cylinder group lean to a stoichiometric control that makes the air-fuel ratios of all of the cylinder groups the stoichiometric air-fuel ratio, the switch to the stoichiometric control is made after making the air-fuel ratio of the cylinder group that was made rich by the cylinder group-specific control lean for a predetermined period of time and making the air-fuel ratio of the cylinder group that was made lean by the cylinder group-specific control rich for the predetermined period of time.

16. The control method according to claim 15, wherein when the operating state of the internal combustion engine is switched from a fuel cut control that stops fuel from being supplied to all of the cylinder groups to a cylinder group-specific control that makes an air-fuel ratio of one cylinder group rich and makes the air-fuel ratio of another cylinder group lean, the air-fuel ratio of the one cylinder group and the air-fuel ratio of the other cylinder group are set such that the air-fuel ratio of the common exhaust passage becomes rich for a predetermined period of time.

17. The control method according to claim 15, wherein when the operating state of the internal combustion engine is switched from a cylinder group-specific control that makes an air-fuel ratio of one cylinder group rich and makes the air-fuel ratio of another cylinder group lean to fuel cut control that stops fuel from being supplied to all of the cylinder groups, an exhaust gas flowrate is controlled such that more exhaust gas flows through the individual exhaust passage corresponding to the cylinder group in which the air-fuel ratio has been made lean by the cylinder group-specific control than flows through the individual exhaust passage corresponding to the cylinder group in which the air-fuel ratio has been made rich by the cylinder group-specific control.

* * * * *